United States Patent
Hirsch et al.

(10) Patent No.: US 9,533,711 B2
(45) Date of Patent: Jan. 3, 2017

(54) CHASSIS FOR UTILITY VEHICLES

(71) Applicant: Engineering Center Steyr GmbH & Co KG, St. Valentin (AT)

(72) Inventors: Alois Hirsch, Weistrach (AT); Gregor Schwarz, Dietach (AT); Martin Sinn, Dietach (AT)

(73) Assignee: ENGINEERING CENTER STEYR GMBH & CO KG, St. Valentin (AT)

( * ) Notice: Subject to any disclaimer, the term of this patent is extended or adjusted under 35 U.S.C. 154(b) by 0 days.

(21) Appl. No.: 14/711,637

(22) Filed: May 13, 2015

(65) Prior Publication Data
US 2015/0329146 A1 Nov. 19, 2015

(30) Foreign Application Priority Data

May 14, 2014 (DE) .......................... 10 2014 209 130

(51) Int. Cl.
| | |
|---|---|
| B62D 21/20 | (2006.01) |
| B62D 27/02 | (2006.01) |
| B62D 25/08 | (2006.01) |
| B62D 21/02 | (2006.01) |
| B62D 21/11 | (2006.01) |
| B62D 63/02 | (2006.01) |
| B60G 3/20 | (2006.01) |

(52) U.S. Cl.
CPC ............... B62D 21/20 (2013.01); B60G 3/20 (2013.01); B62D 21/02 (2013.01); B62D 21/11 (2013.01); B62D 25/08 (2013.01); B62D 27/023 (2013.01); B62D 63/025 (2013.01); B60G 2200/144 (2013.01)

(58) Field of Classification Search
CPC ......... B62D 21/20; B62D 21/02; B62D 21/12; B62D 27/023; B62D 25/08; B62D 33/02; B62G 11/27
See application file for complete search history.

(56) References Cited

U.S. PATENT DOCUMENTS

| | | | | |
|---|---|---|---|---|
| 2,096,060 | A * | 10/1937 | Perron | B60G 11/00 267/249 |
| 4,635,957 | A * | 1/1987 | Merkle | B60G 3/20 280/124.136 |
| 6,871,875 | B2 * | 3/2005 | Grimm | B62D 21/12 180/312 |

(Continued)

FOREIGN PATENT DOCUMENTS

| | | |
|---|---|---|
| DE | 10159468 A1 | 6/2003 |
| DE | 102009012350 A1 | 9/2010 |

(Continued)

OTHER PUBLICATIONS

German Search Report dated Jan. 16, 2015.
Search Report dated Sep. 4, 2015 in corresponding European Patent Application Serial No. EP15157638.

*Primary Examiner* — Darlene P Condra
(74) *Attorney, Agent, or Firm* — Dickinson Wright PLLC

(57) ABSTRACT

A chassis for a utility vehicle, in particular for semi-trailer vehicles, is comprised of: a front subassembly assigned to a front axle region of the utility vehicle, a rear subassembly assigned to a rear axle region of the utility vehicle, and a central subassembly which connects together the front subassembly and the rear subassembly.

19 Claims, 3 Drawing Sheets

(56) References Cited

U.S. PATENT DOCUMENTS

| | | | | |
|---|---|---|---|---|
| 8,727,062 B2* | 5/2014 | Ibe | ............... | B60K 17/04 |
| | | | | 180/291 |
| 8,910,740 B2* | 12/2014 | Ehl | ............... | B60K 5/00 |
| | | | | 180/311 |
| 8,944,207 B2* | 2/2015 | Gulan | ............ | B60K 5/12 |
| | | | | 180/312 |
| 2004/0056468 A1 | 3/2004 | McNally | | |
| 2009/0033127 A1* | 2/2009 | Duerr | ............ | B62D 21/02 |
| | | | | 296/203.01 |

FOREIGN PATENT DOCUMENTS

| | | | |
|---|---|---|---|
| DE | 102010010366 A1 | | 9/2011 |
| DE | 102012013901 A1 | | 1/2014 |
| EP | 0591715 A2 | | 4/1994 |
| EP | 1318064 A2 | | 6/2003 |
| EP | 1902873 A1 | | 3/2008 |
| JP | 2003327154 A | * | 11/2003 |

* cited by examiner

CHASSIS FOR UTILITY VEHICLES

CROSS-REFERENCE TO RELATED APPLICATIONS

This application claims the benefit and priority of German Application No. DE102014209130.6 filed on May 14, 2014. The entire disclosure of the above application is incorporated herein by reference.

TECHNICAL FIELD

The present invention relates to a chassis for utility vehicles comprising a front subassembly assigned to a front axle region of the utility vehicle, a rear subassembly assigned to a rear axle region of the utility vehicle, and a central subassembly which connects together the front subassembly and the rear subassembly.

BACKGROUND

This section provides background information related to the present disclosure which is not necessarily prior art.

Chassis for utility vehicles are generally manufactured on the basis of a continuous ladder frame. Such a ladder frame consists of two longitudinal members which are formed, for example, as C-shaped profiled elements and which are connected together by a plurality of crossmembers. Generally the longitudinal members are screwed or riveted to the crossmembers. Different vehicle components are attached to the frame, such as for example the front and rear axles, the drive units, the driver's cab, the transport structure or semi-trailer coupling, the fuel tank, the battery housing, as well as the exhaust gas system. It is desirable to provide a modular design in order to be able to apply one type of chassis to different vehicle variants or drive systems in a flexible manner.

Chassis of the ladder frame design are sufficiently stable, but have a relatively high dead weight. This problem of a high dead weight is exacerbated as, due to statutory emission requirements which are becoming increasingly strict, additional exhaust gas treatment components such as for example catalytic converters or urea tanks have to be provided on the vehicle. Further factors increasing the weight are the higher proportion of electronics, in terms of sensor systems and actuating systems, greater comfort requirements and the use of alternative fuels or drive concepts, wherein hybrid drives, in particular, may be cited as an example thereof. A high dead weight is associated with a lower payload, increased fuel consumption and, as a result, with undesirable additional costs and greater pollution.

A chassis of modular construction for utility vehicles is disclosed in DE 102009012350A1, said chassis achieving a reduction in weight relative to conventional chassis whilst maintaining the usual properties of rigidity and strength, wherein the central subassembly is configured as a box-shaped hollow profile made of sheet metal formed parts and the longitudinal members of the front and rear subassemblies are at least partially configured from closed profiled parts and at least one of the front and rear subassemblies is releasably attached to the central subassembly.

The inner hollow space of the box structure of the central subassembly may be used, for example, for the protected accommodation of parts of the drive system, the supply tank and/or the exhaust gas system of the utility vehicle. As one of the connecting points between the individual subassemblies is releasable, the vehicle parts to be accommodated may be easily inserted when assembling the utility vehicle. For connecting a conventional utility vehicle frame to an independent wheel suspension and for fastening attachments and an underride protection system thereto, a plurality of heavy and complex brackets are generally required. In order to avoid problems of vibration and rigidity in this design, the frame itself has to be designed to be very rigid and thus heavy. Therefore, at the present time, chassis with independent wheel suspension are hardly used in spite of the advantages of independent wheel suspension.

A suspension subframe for an independent wheel suspension for a utility vehicle is disclosed in EP1902873 A1, said suspension subframe having retaining elements for attaching the suspension device and the transverse control arm, and being able to be attached to the frame longitudinal members of the vehicle. The retaining elements are designed in this case as pressed parts or welded assemblies and, due to the attachment thereof to the conventional vehicle longitudinal members, the total weight tends to be increased by the construction.

SUMMARY

This section provides a general summary of the disclosure and is not a comprehensive disclosure of its full scope or all of its features.

It is, therefore, the object of the invention within the context of a modular design to provide a module for independent wheel suspensions which does not introduce any additional weight or barely any additional weight and is able to be easily attached to existing lightweight structures.

More specifically, the object is achieved by a chassis for utility vehicles, in particular for semi-trailer vehicles, which comprises: a front subassembly assigned to a front axle region of the utility vehicle; a rear subassembly assigned to a rear axle region of the utility vehicle; and a central subassembly which connects together the front subassembly and the rear subassembly, wherein the rear subassembly and/or the front subassembly have at least one rear axle module and/or front axle module for the independent wheel suspension. Advantageously, the construction in accordance with the invention is lightweight and avoids heavy brackets for the independent wheel suspension.

It is advantageous that either the front subassembly or the rear subassembly is releasably or unreleasably connected to the central subassembly, in particular welded thereto, resulting in a high degree of flexibility.

Advantageously, the front subassembly and/or the rear subassembly consists of at least one top chord and at least one bottom chord which are connected to connectors in a shear-resistant manner. As a result, a constructional space is produced which serves for receiving components of the vehicle and which is designed for the attachment thereof.

It is advantageous here that the connectors connect both of the bottom chords and the top chords on each side of the vehicle. The design simplifies the overall construction.

Alternatively, it is also advantageous if the top chord and the bottom chord consist of one component.

In one advantageous embodiment, the top chord and/or the bottom chord form an angle relative to the vehicle longitudinal axis.

It is advantageous that the front subassembly and/or the rear subassembly are adapted to the overall height of the central subassembly in order to ensure an optimal introduction of forces into the structures of the lightweight frame.

The modular construction is advantageous if the front subassembly serves for receiving at least one front axle or the rear subassembly serves for receiving at least one leading axle and/or rear axle and/or trailing axle.

Advantageously, an underride protection system or longitudinal control arm for the drive axle is attached to the bottom chord.

It is advantageous that the attachment of the independent wheel suspension to the upper and lower transverse control arms takes place on the connectors. Advantageously, the connectors between the top chord and bottom chord on one side of the frame and between the top chords and/or bottom chords between both sides of the frame are designed as a continuous component or subassembly.

It is also advantageous if the spring is attached below the shear centre of the supporting structure, in particular below the top chord.

It has been shown that, due the mixed modular design according to the invention being comprised of closed profiled elements connected together and sheet metal formed parts, a significant weight reduction is able to be achieved whilst maintaining the required strength values, in particular the torsional rigidity. Calculations have shown that in a commercial semi-trailer vehicle a drastic reduction in weight may be achieved in comparison with a ladder frame design. As a result, an increase in the payload is in turn possible. Moreover, the assembly cost is reduced due to the relatively low number of screw connections.

Further areas of applicability will become apparent from the description provided herein. The description and specific examples in this summary are intended for purposes of illustration only and are not intended to limit the scope of the present disclosure.

DRAWINGS

The invention is described hereinafter by way of example with reference to the accompanying drawings, in which.

DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 4:
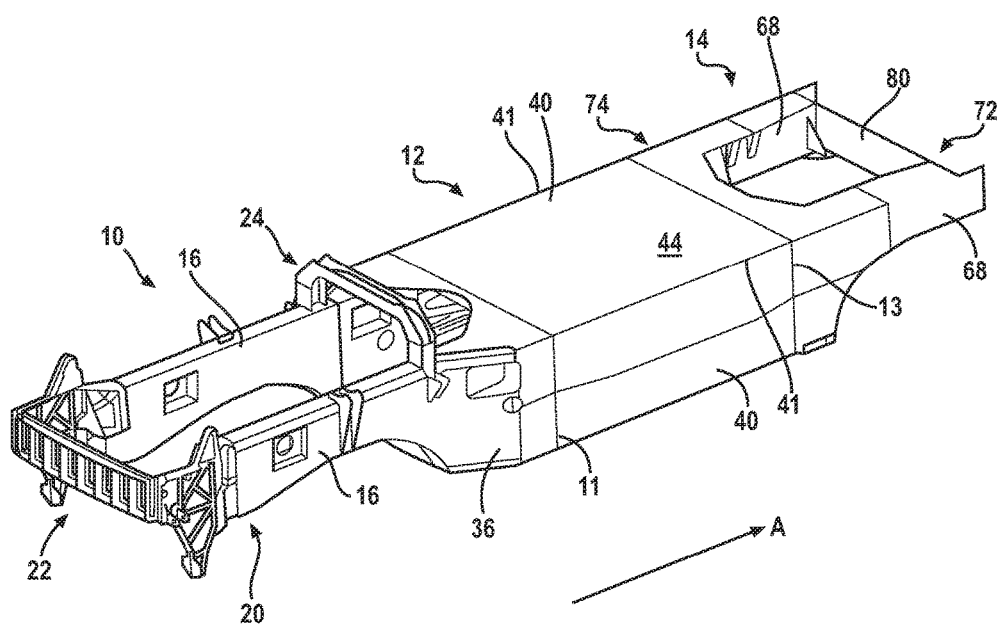
FIG. 4 illustrates a design made by lightweight construction technology in the prior art.

In FIG. 4, a chassis for a 4×2 semi-trailer vehicle is illustrated by way of example. Along the vehicle longitudinal axis A the chassis is subdivided into a front subassembly 10, a central subassembly 12 and a rear subassembly 14. The front subassembly 10 is assigned to the front axle region of the semi-trailer vehicle, whereas the rear subassembly 14 is assigned to the rear axle region of the semi-trailer vehicle. The front subassembly 10 comprises two longitudinal members 16 spaced apart from one another transversely to the vehicle longitudinal axis A, which are formed from partially closed profiled parts, in particular sheet metal profiled parts. On the front end portion 20 of the front subassembly 10, the longitudinal members 16 are connected by a crossmember element 22. Each of the two longitudinal members 16 additionally has at the rear end portion 24 a funnel-shaped widening 36 as a connecting element to the central subassembly 12.

The central subassembly 12 is produced from sheet metal formed parts made from a rolled and bent composite metal sheet. Moreover, the composite metal sheets in each case are bent back in the straight regions along two bending edges 41 so that ultimately a U-shaped half shell 40 is produced. The bending edges 41 extend in the vehicle longitudinal direction A and transversely to the rolling direction of the metal sheets. Two such half shells 40 are blunt-welded in order to form a cuboid hollow profile 44. On the inner side surfaces of the hollow profile 44 insertion portions formed in the region of the bending edges 41 in the base plate are provided for the fuel tank, urea tank and/or for energy storage units of different designs.

The rear structural unit 14 consists of two short longitudinal members 68 made of substantially closed profiled elements which in the rear end portion 72 are fixedly connected together by a sheet metal crossmember 80 and in the front end portion 74 by a further sheet metal crossmember.

In the embodiment illustrated, the front subassembly 10 is welded at a front connecting point 11 to the central subassembly 12, whilst the rear subassembly 14 is screwed at a rear connecting point 13 to the central subassembly 12. The connecting point 13 between the central subassembly 12 and the rear subassembly 14 is thus releasable.

To improve upon this prior art, the rear subassembly 14 and/or the front subassembly 10 are replaced by modules for the independent wheel suspension.

At least one these subassemblies replaces the subassemblies illustrated in the prior art by the front axle module and/or rear axle module according to the invention.

Figure 1:
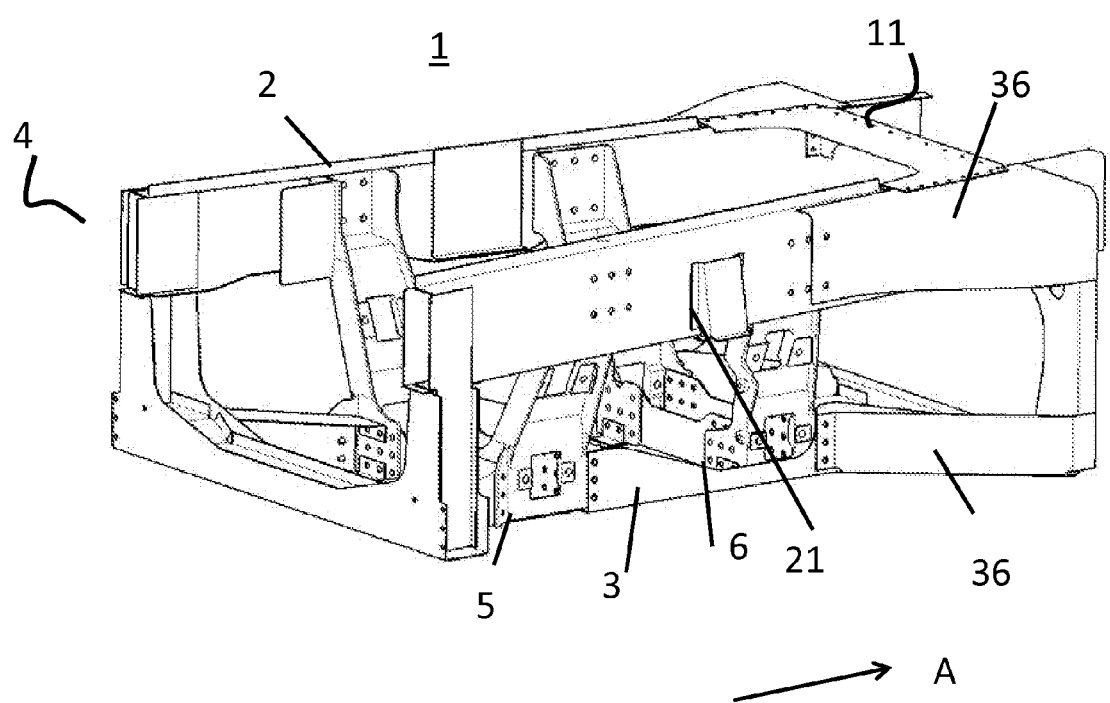
FIG. 1 illustrates a schematic view of the exemplary embodiment on the example of the front axle.

FIG. 1 illustrates a front axle module 1 which serves as a front subassembly 10. FIG. 1 illustrates the front axle module without the attached individual wheel suspension and the attachments of FIGS. 3 and 4. This module serves as an exemplary embodiment as it may represent the module for the front axle suspension and the rear axle module for the leading axle and/or trailing axle.

The front axle module 1 is comprised, in each case, of a top chord 2 guided along both vehicle longitudinal sides and a bottom chord 3 respectively guided along both vehicle longitudinal sides. The top and bottom chords 2, 3 are connected together in a shear-resistant manner via connectors 5 and 6. The top chord 2 and the bottom chord 3 are straight or, for receiving large radiators at the front, form an angle relative to the outside counter to the vehicle longitudinal axis. At the connecting point 11 to the central subassembly a funnel-shaped widening 36 is attached to the top chord and bottom chord 2, 3.

For mounting further components the top chord and the bottom chord 2, 3 have stops 21 and fastening means.

The connectors 5 and 6 are configured to be trough-shaped and additionally at the connecting points with the top and bottom chords 2, 3 also have connections for components. Thus the connectors 5, 6 serve for receiving transverse control arms, the shock absorbers, the steering system and the front engine bearing.

The connectors 5, 6 required for receiving the independent wheel suspension are formed from structural elements and have to be shaped so that the constructional space required for receiving the drive train is present within the module. Moreover, the connectors 5, 6 receive the steering components. The connectors are shaped so that they connect the two bottom chords in the transverse direction and are guided on each side so that the bottom and top chords 3, 2 are connected together.

The connectors 5, 6 serve at the same time for receiving the engine bearing and the shock absorbers.

The components of the top and bottom chord may also consist of a single component, for example a sheet metal component.

The top and bottom chord and/or the independent wheel suspension module are guided approximately level with the central subassembly of the lightweight frame, in order to utilize optimally the overall height of the lightweight frame. However, it is not relevant to the invention that the individual wheel suspension module as the front subassembly or rear subassembly 10, 14 has the same overall height as the central subassembly 12. Here there is the option of adapting the subassemblies in an optimum manner, wherein the direct flux of force through the entire frame is paramount.

In a preferred embodiment, the connecting point 11 to the central subassembly 12 is at the same height and width, but has to be drawn in at the front in terms of width in order to provide the required constructional space for receiving the independent wheel suspension, the suspension and the space for the wheel steering.

The contour of the module is selected so that it integrates and/or takes into account the connecting points and the constructional space of all components in the region of the module, for example the axle mounting, radiator module, driver's cab mounting, underride protection system, engine-gear unit, bumper, boarding steps, towing hook, coupling jaw, so that no additional brackets are required and wherein an optimal flux of force is provided, taking into account the future requirements. This can mean, for example, that the top and bottom chords 2, 3 do not extend straight and parallel to the longitudinal axis but also may form an angle relative to the vehicle longitudinal axis A.

The independent wheel suspension module has a uniform transition from the central module to the independent wheel suspension module in order to permit a uniform flux of force.

The module is made up of shell elements and cast structural elements. This results in a reduction in weight and secondly in increased bending stiffness and torsional rigidity, as well as reducing the vehicle weight and thus increasing the payload.

Figure 2:
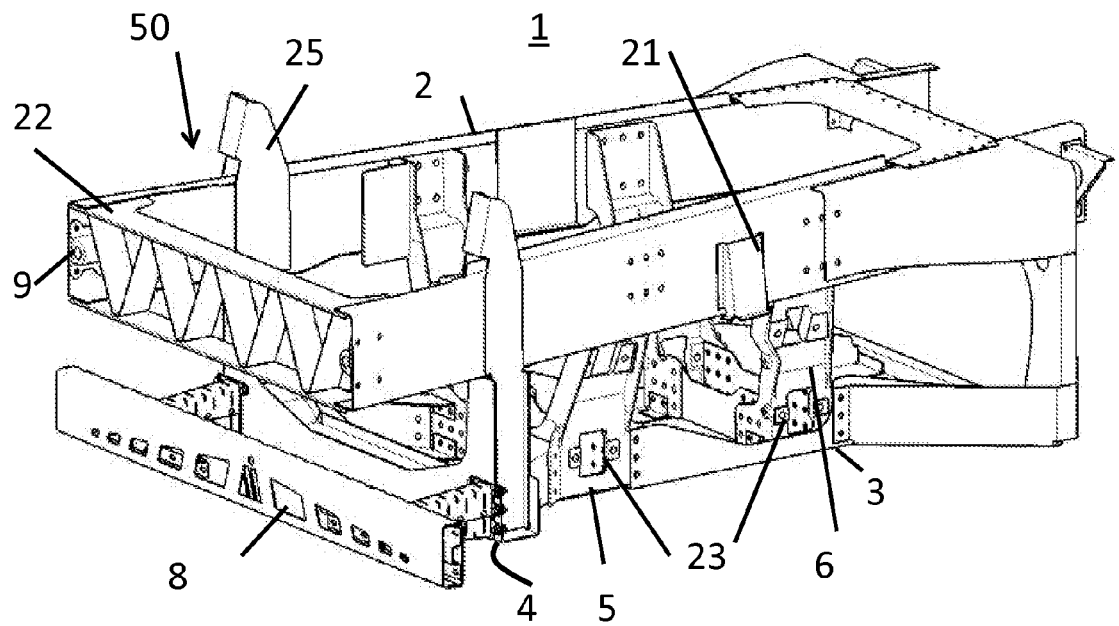
FIG. 2 illustrates an embodiment of the independent wheel suspension on the front axle.

In FIG. 2, a crossmember element 22 is attached to the front axle module 1 between the top chords 2 on both sides and an underride protection system 8 is fastened to the bottom chords extending on both sides. As a result, along the front interface 4 the constructional space 50 for a radiator module is formed, said space being completed by the driver's cab connecting elements 25. The example in this case illustrates a front axle module which consists of only one front axle with independent wheel suspension. The structure of the bottom chord 3 is designed so that the underride protection system 8 prescribed by law may be fastened and/or integrated in a simple manner. As a result, the direct flux of force from the underride protection system 8 through the entire frame is improved, starting with the bottom chords 3 and avoiding a heavy bracket for diverting the flux of force.

The structure around the constructional space 50 formed by the following components: the crossmember element 22, the driver's cab connecting elements 25 and the underride protection system 8, serves for receiving a towing device with towing hooks 9 which are attached in the crossmember element 22, the front driver's cab mounting, the bumper fastening and the boarding step fastening. Connections 23 for the independent wheel suspension are provided on the transverse connectors 5, 6.

For vehicles with a plurality of front axles with independent wheel suspension, further independent wheel suspension modules may be coupled thereto. At the front end of the additional independent wheel suspension module, the radiator module is once again attached to the underride protection system.

Figure 3:
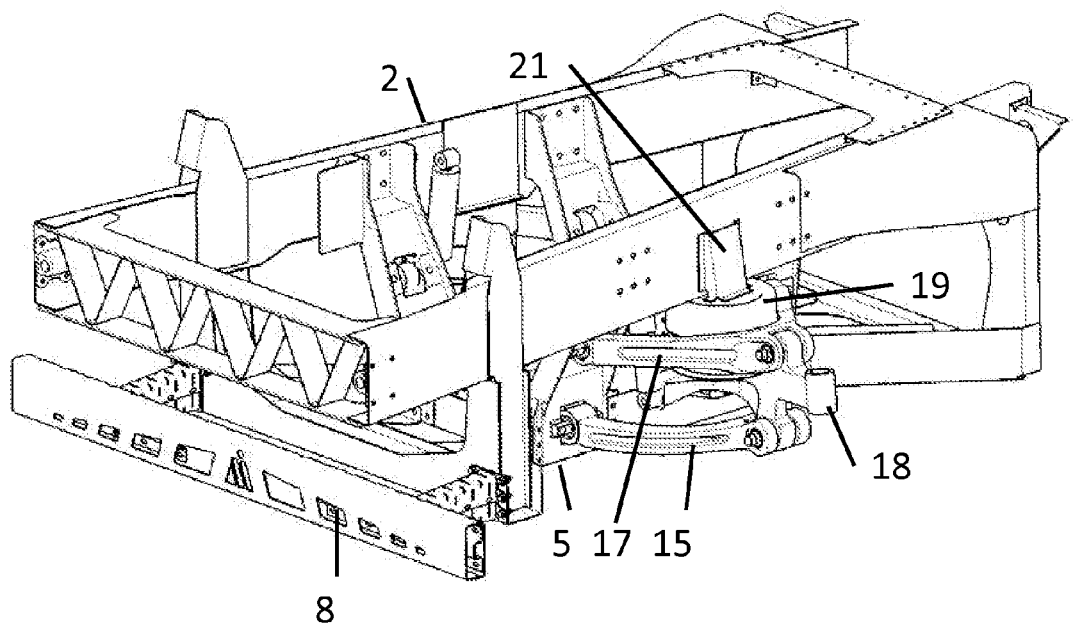
FIG. 3 illustrates an embodiment with mounted components of the independent wheel suspension.

In FIG. 3, the components for an independent wheel suspension are illustrated. A lower transverse control arm 15 and an upper transverse control arm 17 are screwed to the connectors 5 and 6. The two transverse control arms 15, 17 serve for guiding the steering knuckle carrier 18.

The wheel contact forces occurring on the steering knuckle carrier 18 are assisted by a spring 19, preferably a pneumatic spring, on the lower face of the top chord 2 via the stop 21. The spring is attached so that it preferably introduces the force into the shear centre of the top chord 2 and/or the supporting structure. As a result, the frame is prevented from being twisted.

The fastening of the wheel to the independent wheel suspension and the connection to the drive and steering are carried out as known in the prior art.

Preferably, either the front subassembly or the rear subassembly are unreleasably connected to the central subassembly, in particular welded thereto. The welded connection in this case may be designed to be "edge to edge" or overlapping. The unreleasability of one of the two connecting points between the subassemblies increases the stability and reduces the assembly cost.

The top chords and bottom chords of the front subassembly or the top chords and bottom chords of the rear subassembly may comprise one respective funnel-shaped widening for a connection to the central subassembly. In this manner, a particularly stable welded connection may be produced for forming the unreleasable connecting point. Moreover, one respective receiver for the mounting of the drive unit may be incorporated in the funnel-shaped widening.

By the modular design it is also possible to use the module, which is described by way of example as the front axle module, as a rear axle module with independent wheel suspension. In this case, the module is connected at the interface 11 to the connecting point 13 on the rear face of the central subassembly 12. There is the possibility of achieving different axle configurations by combining the modules.

The front module may be used for one and/or more front axles.

By means of the modular solution in accordance with the invention, various combinations may be produced, such as: a leading axle with independent wheel suspension combined with a rear axle module; a rear axle module with trailing axle with independent wheel suspension; and a rear axle unit comprised of a plurality of coupled modules with independent wheel suspension. Thus, all further possible combinations may also be constructed from the individual combinations and by using the modular design. In the configuration as leading axle, the front interface 4 serves for receiving the longitudinal control arm of a rigid rear axle-drive axle.

The combination with independent wheel suspension permits the optimal introduction of the forces which are present into the central subassembly.

The rear axle module may be used for one or more leading and/or rear and/or trailing axles.

If the module is used as a rear axle module, the longitudinal control arm of the drive axle is attached instead of the underride protection system. As a result, it is ensured that the longitudinal forces are optimally introduced into the structure of the frame.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE SIGNS

1 Front axle module
2 Top chord
3 Bottom chord
4 Front interface
5, 6 Connector
8 Underride protection system
9 Towing hook
10 Front subassembly
11 Connecting point
12 Central subassembly
13 Connecting point
14 Rear subassembly
15 Lower transverse control arm
16 Longitudinal member
17 Upper transverse control arm
18 Steering knuckle carrier
19 Spring
20 Front end portion
21 Stop
22 Crossmember element
23 Connector
24 Rear end portion
25 Driver's cab connector elements
36 Funnel-shaped widening
40 Half shell
41 Bending edge
44 Hollow profile
50 Constructional space for cooling system
68 Longitudinal member
72 Rear end portion
74 Front end portion
80 Sheet metal crossmember
A Vehicle longitudinal axis

What is claimed is:

1. A chassis for utility vehicles, the chassis comprising: a front subassembly assigned to a front axle region of the utility vehicle; a rear subassembly assigned to a rear axle region of the utility vehicle; and a central subassembly which connects together the front subassembly and the rear subassembly, wherein the rear subassembly and/or the front subassembly have at least one rear axle module and/or front axle module for an independent wheel suspension, wherein the front subassembly and/or the rear subassembly is comprised of at least one top chord and at least one bottom chord which are connected to connectors in a shear-resistant manner, wherein a longitudinal control arm for a drive axle is attached to the at least one bottom chord, and wherein attachment of the independent wheel suspension to upper and lower transverse control arms takes place on the connectors.

2. The chassis in accordance with claim 1, wherein either the front subassembly or the rear subassembly is releasably or unreleasably connected to the central subassembly.

3. The chassis in accordance with claim 1, wherein the connectors connect both of the at least one bottom chord and the at least one top chord on each side of the vehicle.

4. The chassis in accordance with claim 1, wherein the at least one top chord and the at least one bottom chord are comprised of one component.

5. The chassis in accordance with claim 1, wherein the at least one top chord and/or the at least one bottom chord form an angle relative to the vehicle longitudinal axis.

6. The chassis in accordance with claim 1, wherein the front subassembly and/or the rear subassembly are adapted to the overall height of the central subassembly.

7. The chassis in accordance with claim 1, wherein the front subassembly serves for receiving at least one front axle.

8. The chassis in accordance with claim 1, wherein the rear subassembly serves for receiving at least one rear axle and/or leading axle and/or trailing axle.

9. The chassis in accordance with claim 1, wherein an underride protection system is attached to the at least one bottom chord.

10. The chassis in accordance with claim 1, wherein a spring is attached to the at least one top chord below a shear center of the at least one top chord.

11. A chassis for utility vehicles, the chassis comprising:
a front subassembly assigned to a front axle region of the utility vehicle;
a rear subassembly assigned to a rear axle region of the utility vehicle; and
a central subassembly interconnecting the front subassembly and the rear subassembly;
wherein the rear subassembly and/or the front subassembly have at least one rear axle module and/or front axle module for an independent wheel suspension, wherein the front subassembly and/or the rear subassembly is comprised of at least one top chord and at least one bottom chord which are interconnected via connectors in a shear-resistant manner, and wherein the independent wheel suspension is attached to upper and lower transverse control arms that are attached at the connectors.

12. The chassis in accordance with claim 11, wherein the upper and lower control arms are attached to a steering knuckle carrier, and wherein a spring is disposed between the at least one top chord and the knuckle carrier.

13. The chassis in accordance with claim 11, wherein the connectors connect both of the at least one bottom chord and the at least one top chord on each side of the utility vehicle.

14. The chassis in accordance with claim 11, wherein the front subassembly serves for receiving at least one front axle.

15. The chassis in accordance with claim 11, wherein the rear subassembly serves for receiving at least one rear axle and/or leading axle and/or trailing axle.

16. A chassis for a utility vehicle, the chassis comprising:
a front subassembly assigned to a front region of the utility vehicle;

a rear subassembly assigned to a rear region of the utility vehicle; and a central subassembly interconnecting the front subassembly and the rear subassembly;

wherein the rear subassembly and/or the front subassembly have at least one rear axle module and/or front axle module for an independent wheel suspension, wherein the front subassembly and/or the rear subassembly includes at least one top chord and at least one bottom chord which are interconnected by connectors in a shear-resistant manner, and wherein a spring is attached to the at least one top chord below a shear center of the at least one top chord, wherein a longitudinal control arm for a drive axle is attached to the at least one bottom chord, and wherein attachment of the independent wheel suspension to upper and lower transverse control arms takes place on the connectors.

17. The chassis in accordance with claim 16, wherein the front subassembly serves for receiving at least one front axle.

18. The chassis in accordance with claim 16, wherein the rear subassembly serves for receiving at least one rear axle and/or leading axle and/or trailing axle.

19. The chassis in accordance with claim 16, wherein the at least one top chord and the at least one bottom chord are comprised of one component.

* * * * *